(12) United States Patent
Kim et al.

(10) Patent No.: US 8,504,685 B2
(45) Date of Patent: Aug. 6, 2013

(54) PERSONALIZED SERVICE SYSTEM BASED ON SMART CARD AND METHOD THEREOF, AND SMART CARD APPLIED TO THE SAME

(75) Inventors: Seung Hwan Kim, Seongnam-si (KR); Jae Sung Hong, Seoul (KR)

(73) Assignee: SK Planet Co., Ltd, Seoul (KR)

( * ) Notice: Subject to any disclaimer, the term of this patent is extended or adjusted under 35 U.S.C. 154(b) by 238 days.

(21) Appl. No.: 12/866,318

(22) PCT Filed: May 11, 2009

(86) PCT No.: PCT/KR2009/002474
§ 371 (c)(1),
(2), (4) Date: Aug. 5, 2010

(87) PCT Pub. No.: WO2010/005170
PCT Pub. Date: Jan. 14, 2010

(65) Prior Publication Data
US 2010/0325269 A1 Dec. 23, 2010

(30) Foreign Application Priority Data

Jul. 10, 2008 (KR) .................. 10-2008-0067180
Aug. 28, 2008 (KR) .................. 10-2008-0084641

(51) Int. Cl.
*G06F 15/173* (2006.01)
*G06Q 30/00* (2012.01)
*H04B 1/38* (2006.01)
*G06K 5/00* (2006.01)

(52) U.S. Cl.
USPC ........ 709/224; 709/219; 709/248; 705/14.49; 705/14.66; 455/558; 235/380

(58) Field of Classification Search
USPC ........... 709/224, 219, 248; 705/14.66, 14.49; 455/558; 235/380
See application file for complete search history.

(56) References Cited

U.S. PATENT DOCUMENTS 6,129,274 A * 10/2000 Suzuki ...................... 235/381
7,558,563 B2 * 7/2009 Silverbrook et al. ...... 455/414.1
(Continued)

FOREIGN PATENT DOCUMENTS

| CN | 101150818 | 3/2008 |
|---|---|---|
| JP | 2003125098 | 4/2003 |

(Continued)

OTHER PUBLICATIONS

Open Mobile Alliance, OMA-RD_Smartcard_Web_Server-V1_0-20050715-D, Smartcard Web Server Requirements, Draft Version 1_0—Jul. 15, 2005.*

(Continued)

*Primary Examiner* — Alina N Boutah
(74) *Attorney, Agent, or Firm* — Lowe Hauptman Ham & Berner

(57) ABSTRACT

Disclosed are a personalized service system based on a smart card, a method thereof, and a smart card applied to the same. Personalized information is extracted through the data mining by collecting user input information stored based on an SCWS (smart card web server) function, access history information for a site requested by a user, call history information of a user terminal stored based on a USIM (universal subscriber identity module), and base station information received from the user terminal. Since the personalized information is obtained based on the SCWS function and the USIM installed in the smart card, various regulations related to personalized information are circumvented, enabling provision of various personalized services.

20 Claims, 6 Drawing Sheets

(56) References Cited

U.S. PATENT DOCUMENTS

| | | | |
|---|---|---|---|
| 7,952,743 B2* | 5/2011 | Silverbrook et al. | 358/1.15 |
| 8,019,365 B2* | 9/2011 | Fisher | 455/466 |
| 8,090,842 B2* | 1/2012 | Schirar et al. | 709/227 |
| 8,213,991 B2* | 7/2012 | Deprun | 455/558 |
| 8,276,811 B2* | 10/2012 | Waltman | 235/379 |
| 2002/0059313 A1* | 5/2002 | Yoon et al. | 707/200 |
| 2004/0039611 A1* | 2/2004 | Hong et al. | 705/4 |
| 2004/0043758 A1* | 3/2004 | Sorvari et al. | 455/414.1 |
| 2005/0049920 A1* | 3/2005 | Day et al. | 705/15 |
| 2005/0108571 A1* | 5/2005 | Lu et al. | 713/201 |
| 2005/0114539 A1* | 5/2005 | Yoon et al. | 709/231 |
| 2007/0239857 A1* | 10/2007 | Mahalal et al. | 709/219 |
| 2008/0142586 A1* | 6/2008 | Hugot et al. | 235/380 |
| 2008/0251587 A1* | 10/2008 | Martinent et al. | 235/492 |
| 2009/0005016 A1* | 1/2009 | Eng et al. | 455/414.1 |
| 2009/0070159 A1* | 3/2009 | Ahvenainen et al. | 705/7 |
| 2009/0144361 A1* | 6/2009 | Nobakht et al. | 709/203 |
| 2009/0191917 A1* | 7/2009 | Zappulla et al. | 455/558 |
| 2009/0266883 A1* | 10/2009 | Adams et al. | 235/380 |
| 2009/0305687 A1* | 12/2009 | Baldan | 455/419 |
| 2010/0030904 A1* | 2/2010 | Oda et al. | 709/228 |
| 2010/0107225 A1* | 4/2010 | Spencer et al. | 726/4 |
| 2010/0146075 A1* | 6/2010 | Helaine et al. | 709/219 |
| 2010/0146278 A1* | 6/2010 | Maier | 713/171 |
| 2010/0255810 A1* | 10/2010 | Robles et al. | 455/414.1 |
| 2010/0257050 A1* | 10/2010 | Lee | 705/14.43 |
| 2010/0274904 A1* | 10/2010 | Schirar et al. | 709/227 |
| 2010/0281139 A1* | 11/2010 | Deprun | 709/219 |
| 2010/0287307 A1* | 11/2010 | John | 709/248 |
| 2011/0131640 A1* | 6/2011 | Canis Robles et al. | 726/7 |
| 2011/0250866 A1* | 10/2011 | Fisher | 455/410 |
| 2011/0296521 A1* | 12/2011 | Bernabeu | 726/19 |
| 2012/0136795 A1* | 5/2012 | Hoffman et al. | 705/66 |
| 2012/0191557 A1* | 7/2012 | Fisher et al. | 705/21 |

FOREIGN PATENT DOCUMENTS

| | | |
|---|---|---|
| JP | 2008066984 | 3/2008 |
| KR | 1020020032519 | 5/2002 |
| KR | 1020030081817 | 10/2003 |
| KR | 1020040024289 | 3/2004 |
| KR | 1020060088641 | 8/2006 |
| KR | 100764658 | 10/2007 |
| KR | 1020080023964 | 3/2008 |
| KR | 10-1017639 | 2/2011 |
| WO | 2007052151 | 10/2007 |

OTHER PUBLICATIONS

International Search Report for PCT/KR2009/002474.
Japanese Office Action for application No. 2011-517330 dated Dec. 4, 2012.
Korean Notice of Allowance for 10-2008-0084641 dated Nov. 8, 2012.
Shi Jing et al; Automatic Personalization Based on Web Usage Mining; Journal of UEST of China; PLA University of Science and Technology, Nanjing 210016; vol. 31 No. 4; Aug. 2002; pp. 399-403.
First Notification of Office Action for Chinese Patent Application No. 200980105595.4 issued Aug. 31, 2012.

* cited by examiner

PERSONALIZED SERVICE SYSTEM BASED ON SMART CARD AND METHOD THEREOF, AND SMART CARD APPLIED TO THE SAME

CROSS REFERENCE TO RELATED APPLICATION

This application claims the priority of Korean Patent Application No. 10-2008-0067180, filed on Jul. 10, 2008 and the priority of Korean Patent Application No. 10-2008-0084641, filed on Aug. 28, 2008 in the KIPO (Korean Intellectual Property Office), the disclosure of which are incorporated herein in their entirety by reference. Further, this application is the National Phase application of International Application No. PCT/KR2009/002474, filed May 11, 2009, which designates the United States and was published in English. Each of these applications is hereby incorporated by reference in their entirety into the present application.

TECHNICAL FIELD

Exemplary embodiments relate to a method for a personalized service by using a smart card, and more particularly, to a system and a method for a personalized service and a smart card applied to the same, in which various items of history information related to a terminal can be stored in the smart card equipped with an SCWS (smart card web server) function and a USIM (universal subscriber identity module) to provide various personalized services based on the history information.

BACKGROUND ART

According to the conventional personalized service, the personal history and preferences are stored in a server through a network and intellectual personalized information is extracted from the server through an engine to provide the intellectual personalized information for other services, such as personalized advertisement, location-based service and personalized search. However, the personalized service based on the network server represents limitations due to various regulations related to the personalized information.

In this regard, recently, a large scale smart card having the SCWS function is installed in a mobile communication terminal and various service applications are provided in the smart card.

Accordingly, it is necessary to provide a method for solving the limitations occurring in the personalized service based on the network server by using the smart card.

DISCLOSURE

[Technical Problem]

Exemplary embodiments may provide a system and a method for a personalized service and a smart card applied to the same, in which various items of history information related to a terminal can be stored in the smart card equipped with an SCWS (smart card web server) function and a USIM (universal subscriber identity module) to provide various personalized services based on the history information.

[Technical Solution]

According to one or more embodiments, there may be provided a system for a personalized service based on a smart card, including: a user terminal linked with the smart card for accessing a site requested by a user through a browser installed in the user terminal; and the smart card, with an SCWS (smart card web server) and a USIM (universal subscriber identity module) combined therein, for collecting and storing user history information, accumulated by the SCWS and the USIM, based on predetermined events, and performing a data mining based on the user history information to extract personalized information.

According to one or more embodiments, there may be provided a smart card for a personalized service, including: a history information collection unit linked with a user terminal having a browser, for collecting user history information based on predetermined events; a personalized information extraction unit for performing a data mining based on the user history information and extracting personalized information; and an interface unit for providing the extracted personalized information upon a request from a specific application located inside or outside the smart card.

According to one or more embodiments, there may be provided a method for providing a personalized service based on a smart card in cooperation with a user terminal having a browser, including: collecting user history information based on predetermined events; performing a data mining based on the collected user history information; and providing personalized information extracted through the data mining to a specific application upon a request thereof.

[Advantageous Effects]

According to the system and method for a personalized service and the smart card applied to the same of the present invention, the personalized information can be obtained based on the SCWS function and the USIM installed in the smart card, so that the smart card can collect and extract various items of personalized information without being linked with the network server.

In addition, different from the conventional personalized service based on the network server, which represents limitations due to various regulations related to the personalized information, the present invention obtains the personalized information based on the SCWS function and the USIM installed in the smart card, so that the personalized information can be easily collected and utilized for various personalized services.

BEST MODE

[Mode for Invention]

Hereinafter, the exemplary embodiments of the present invention will be described in detail with reference to the accompanying drawings.

Figure 1:
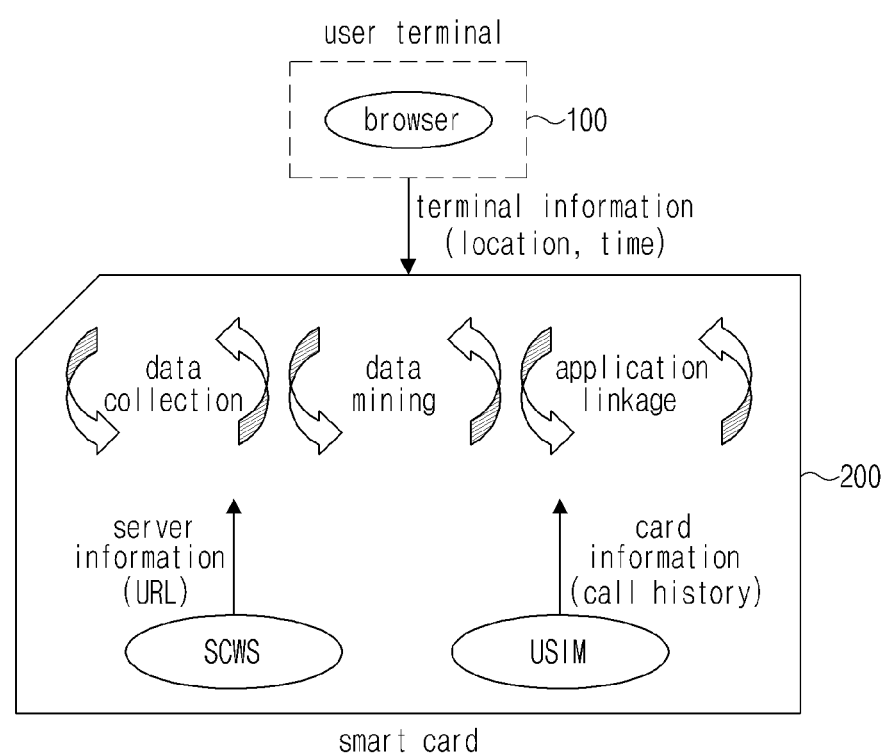
FIG. 1 is a schematic view showing a system for a personalized service based on a smart card according to an embodiment of the present invention.

FIG. 1 is a schematic view showing a system for a personalized service based on a smart card according to an embodiment of the present invention.

As shown in FIG. 1, the system includes a user terminal 100 accessing a site requested by a user through a browser installed in the user terminal 100, and a smart card 200 equipped with an SCWS (smart card web server) function and a USIM (universal subscriber identity module) to collect user history information and extract personalized information based on the SCWS function and the USIM.

The user terminal 100 links with the smart card 200 to access the site requested by the user through the browser installed in the user terminal 100. The site requested by the user may include a Website or a Wapsite. In other words, the site is located outside the user terminal 100 or installed in the smart card 200 as an applet based on the SCWS function. In addition, the user terminal 100 periodically receives base station information from a base station located adjacent to the user terminal 100 through a communication module installed in the user terminal 100 to perform the location registration.

The smart card 200 has: ① a data collection function for collecting the user history information based on the SCWS function and the USIM by linking with the user terminal 100, ② a data mining function for extracting the personalized information based on the user history information, and ③ an application linkage function for supplying the extracted personalized information to a specific application requesting the personalized information.

① Data Collection Function

The smart card 200 collects the user history information, which is generated as the user uses the SCWS function of the smart card 200. In detail, the smart card 200 collects user input information, which is essentially required when the user initially uses the SCWS function. The user input information refers to primary data made by the user, such as age, sex, address and hobbies of the user. The range of the primary data may vary depending on the settings of the administrator.

In addition, the smart card 200 collects the access history information to the site requested by the user. In detail, the smart card 200 collects the external access history of the user through the browser installed in the user terminal 100 and the access URL information managed by the Website or registered in the SCWS in the form of cookie files as the user accesses applet-based sites installed in the smart card 200 based on the SCWS function. When the smart card 200 collects the user history information, which is generated as the user uses the SCWS function, the smart card 200 can extract the user history information from the applets based on the SCWS function by applying the shareable interface mechanism defined in Java Card 2.2.1.

In addition, the smart card 200 collects the user history information based on the USIM installed in the smart card 200. In detail, the smart card 200 collects the call history of the user terminal 100 stored in the file structure of the USIM.

Further, the smart card 200 collects the user history information received from the user terminal 100. In detail, the smart card 200 collects location and time information, which are included in the base station information received from the user terminal 100, through the CAT (credit authorization terminal) framework according to the predetermined period set by the user, that is, according to the events. Besides the base station information, the smart card 200 may receive various external data from the user terminal 100 or external servers according to the settings of the user.

Meanwhile, the data collection function of the smart card 200 may be performed on the basis of the events generated from the external server, the user terminal 100 and the smart card 200. In detail, the data collection function of the smart card 200 may be performed on the basis of predetermined events, such as the server triggering event generated from a specific external server, the local triggering event generated from specific applications installed in the user terminal 100 and the smart card 200, and the auto-triggering event periodically occurring from the smart card 200. In the case of the server triggering event, the specific external server assigns and instructs the point of time to perform the data collection function of the smart card 200. In the case of the local triggering event, the data collection function of the smart card 200 is performed according to the instruction of the site requested by the user, which is prepared in the form of an applet in the smart card 200, and the user terminal 100 accesses the site through the browser installed in the user terminal 100. In the case of the auto-triggering event, the data collection function of the smart card 200 is performed according to the transaction, which may occur based on the predetermined time period set in the smart card 200 or upon the update of the applications installed in the smart card 200.

② Data Mining Function

The smart card 200 extracts the personalized information based on the user history information collected through the data collection function by performing the data mining. In detail, the smart card 200 extracts the personalized information including the preferences, favorites, interests and propensities of the user by performing the data mining based on the user history information, such as the call history, location history, purchase history, visit history and personal information. The data mining may be performed through a mining mechanism including a neural network, K-means clustering and decision tree.

③ Application Linkage Function

Figure 2:
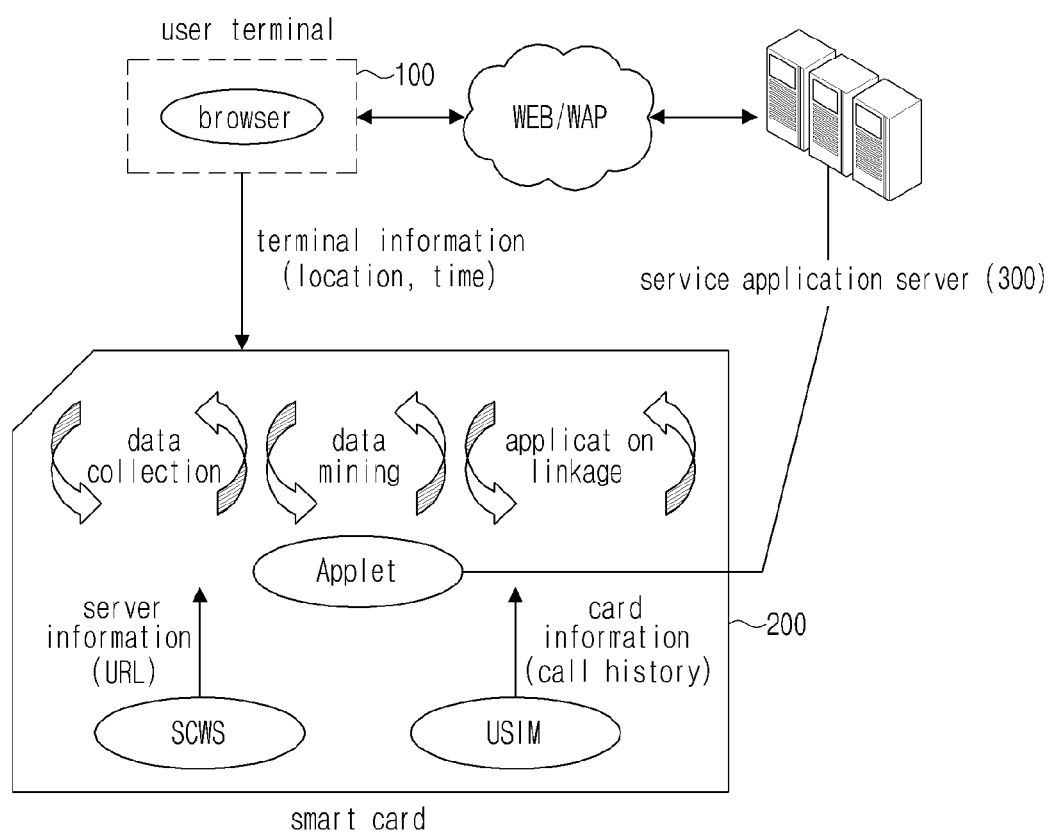
FIG. 2 is a schematic view showing a system for a personalized service based on a smart card according to another embodiment of the present invention.

The smart card 200 includes an interface to provide the extracted personalized information upon the request from the specific applications located inside or outside the smart card 200. In detail, the smart card 200 provides the personalized information extracted through the data mining function upon the request from the specific application installed in the smart card 200 as an applet or located in a server of a mobile communication network, so that various special services can be provided to the user through the operation of the specific application receiving the personalized information. For instance, as shown in FIG. 2, the system may include a service application server 300 that provides the personalized service through the user terminal 100 based on the personalized information extracted through the smart card 200. The service application server 300 is installed in the smart card 200 as an applet or prepared as a separate server of a mobile network to provide various additional services, such as the advertisement or the fortune, by using the personalized information. If the service application server 300 is installed in the smart card 200, the service application server 300 receives push-type additional service contents from a separate server located in the Web or the Wap and provides the additional service suitable for individual users by selecting the additional service from among the additional service contents based on the personalized information extracted through the smart card 200.

Figure 3:
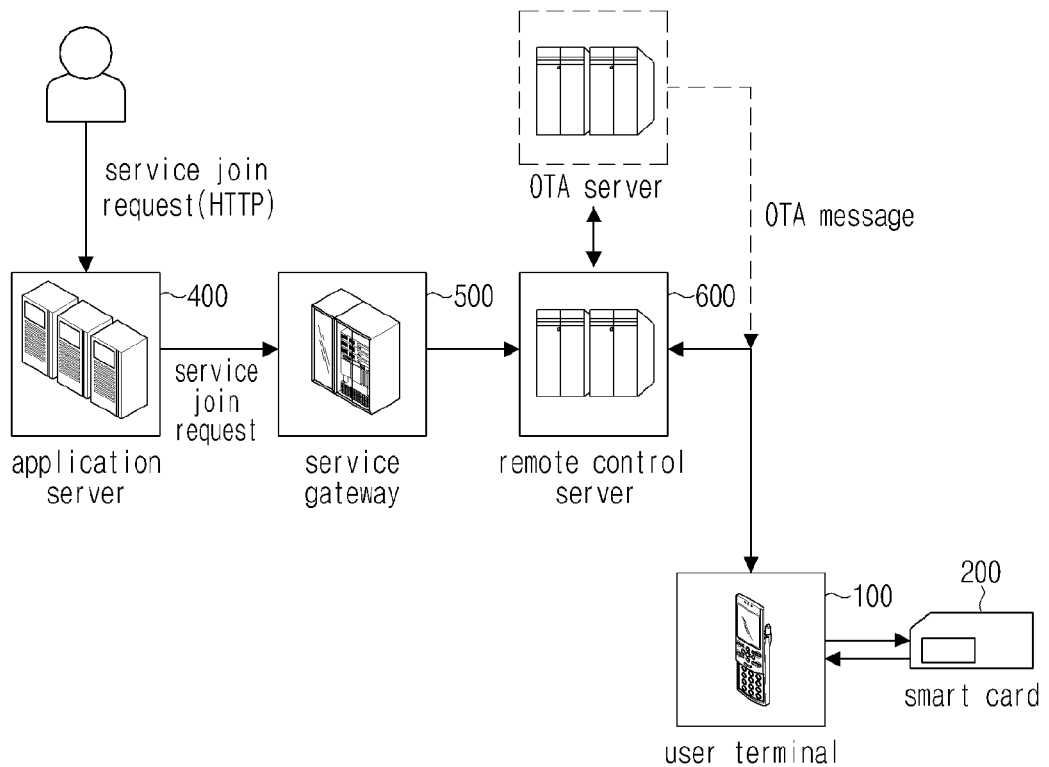
FIG. 3 is a view showing the application installation environment of a smart card according to an embodiment of the present invention.

As described above, the smart card 200 can be equipped with various applications, such as the service application server 300, in the form of applets based on the SCWS function, and the installation environment for such applications is shown in FIG. 3.

In order to register the specific service requested by the user based on the SCWS function installed in the smart card 200, the system may include an application server 400 that receives the service join request from users, a service gateway 500 linked with the smart card 200 to perform the service registration procedure upon receiving the service join request from the application server 400, and a remote management server 600 forming an interface with respect to the user terminal 100 to relay communication between the service gateway 500 and the user terminal 100.

The application server 400 is equipped with at least one service application based on the smart card. For instance, the application server 400 receives the service join request for a specific service from the user who accesses the application server 400 through a predetermined protocol including an HTTP (XML over TCP/IP) and transmits the service join request including the user input information to the service gateway 500 to provide the user with the specific service.

Upon receiving the service join request from the application server 400, the service gateway 500 identifies the user based on the user input information to perform the service registration procedure and checks the user terminal to determine whether the specific service is suitable for the user terminal. In detail, the service gateway 500 previously stores the user information including the subscriber information and the user terminal information, identifies the user and checks whether the specific service is suitable for the user terminal based on the user input information included in the service join request and the user information stored in a data storage unit.

In addition, the service gateway 500 forms the interface with respect to the smart card 200 to request the registration of the specific service. In detail, the service gateway 500 establishes a parameter to register the specific service in the smart card through a predetermined scheme, such as an FSM (finite state machine) scheme. That is, the service gateway 500 forms a session with respect to the smart card 200 through the OTA (over-the-air) message linked with the remote management server 600, and transfers a URL address corresponding to a sector, which is assigned to the SCWS, through the session to primarily set the protection set value that defines communication and identification schemes with respect to the smart card 200. The communication scheme defined by the protection set value may include the OTA message and TLS (transport layer security) session scheme. In addition, a normal identification scheme, which is used for wireless data transmission/reception based on the SCWS, can be utilized as the identification scheme. In order to register the service, the service gateway 500 creates an ID for the specific service on the smart card 200, and maps the ID with the URL address. In addition, the service gateway 500 assigns the protection set value to the ID, thereby completing the parameter establishment for the service registration.

When the parameter establishment for the service registration has been completed, the service gateway 500 transmits the contents to provide the specific service. In detail, based on the identification scheme defined by the protection set value obtained through the parameter establishment procedure, the service gateway 500 transmits the contents for realizing the specific service registered in the application server 400 to the URL address of the smart card 200 through the OTA message or the session. Preferably, the service gateway 500 divides the contents into several groups when transmitting the contents by taking the performance of the smart card 200 into consideration.

Based on the above structure, the smart card 200 receives the OTA message linked with the remote management server 600 from the gateway 500 through the user terminal 100 to form the session with respect to the remote management server 600, and establishes the parameter for registration of the specific service as the service registration request is received from the service gateway 500 through the session. In detail, the smart card 200 receives the URL address from the service gateway 500 through the session and sets the protection set value that defines the communication and identification schemes with respect to the service gateway 500. In addition, the smart card 200 creates the ID for the specific service and maps the ID with the URL address. In addition, the smart card 200 assigns the protection set value to the ID, thereby completing the parameter establishment for the service registration. Further, based on the identification scheme defined by the protection set value, the smart card 200 stores the contents received from the service gateway 500 through the OTA message or the session to realize the specific service in the URL address of the SCWS, thereby completing the registration of the specific service.

As described above, different from the conventional personalized service based on the network server, which represents limitations due to various regulations related to the personalized information, the system for the personalized service based on the smart card according to the present invention can obtain the personalized information based on the SCWS function and the USIM installed in the smart card 200, so that the present invention can provide various personalized services while circumventing the various regulations related to the personalized information.

Figure 4:
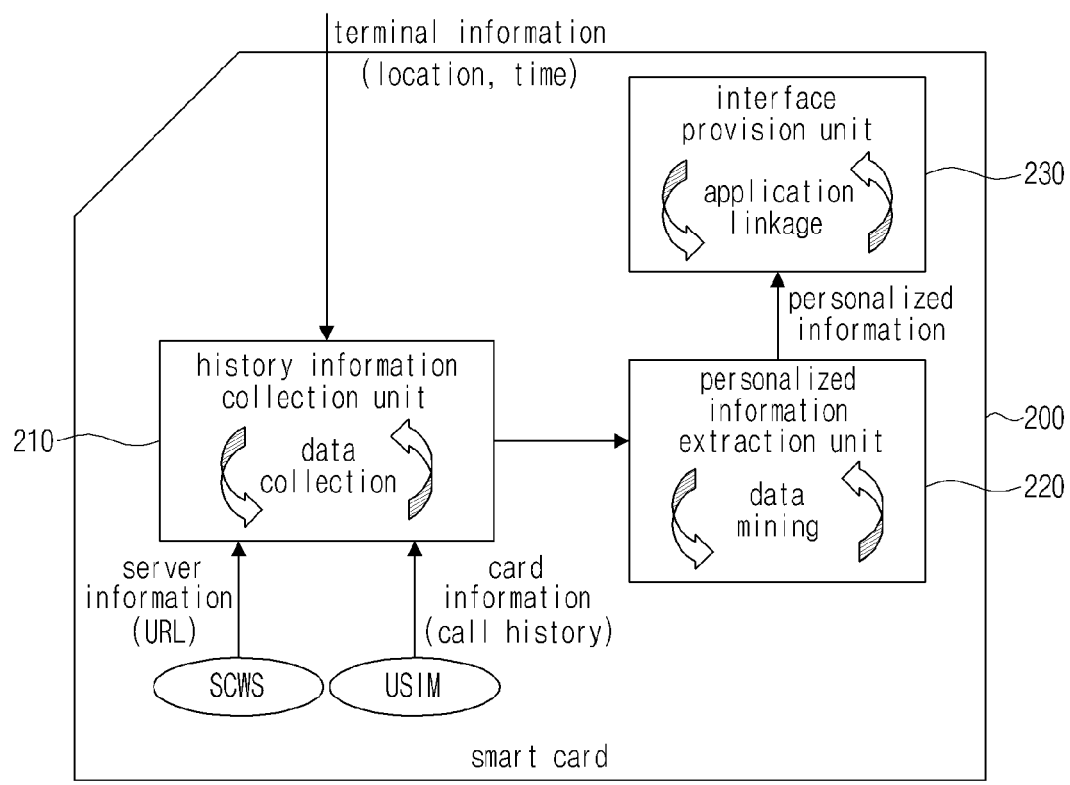
FIG. 4 is a schematic view showing the structure of a smart card according to an embodiment of the present invention.

Hereinafter, the structure of the smart card 200 will be described in detail with reference to FIG. 4. The smart card 200 includes a history information collection unit 210, a personalized information extraction unit 220 and an interface provision unit 230. The history information collection unit 210 is equipped with the SCWS function and the USIM and linked with the user terminal 100 having the browser to collect the user history information. The personalized information extraction unit 220 extracts the personalized information based on the user history information by performing the data mining. The interface provision unit 230 provides the interface for the extracted personalized information upon the request of the specific application located inside or outside the smart card 200.

The history information collection unit 210 is linked with the user terminal 100 to collect the user history information based on the SCWS function and the USIM according to the events occurring from the specific external server, the user terminal 100 or the smart card 200 (data collection function of the smart card shown in FIGS. 1 and 2). In detail, the history information collection unit 210 collects the user history information based on the predetermined events, such as the server triggering event generated from the specific external server, the local triggering event generated from the specific applications installed in the user terminal 100 and the smart card 200, and the auto-triggering event periodically occurring from the smart card 200.

Figure 5:
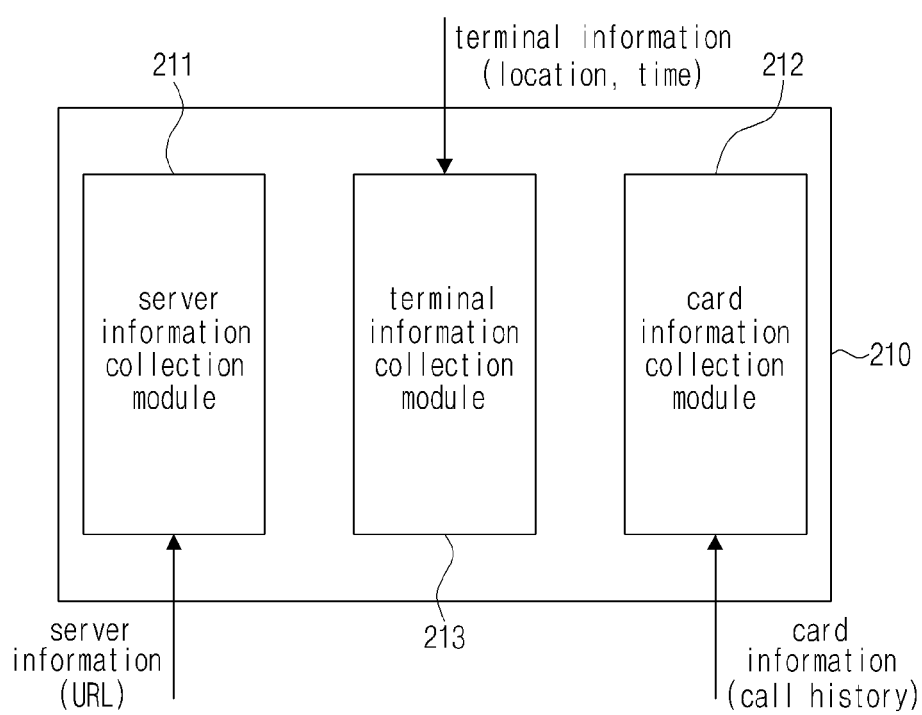
FIG. 5 is a schematic view showing the structure of a history information collection unit according to an embodiment of the present invention.

To this end, as shown in FIG. 5, the history information collection unit 210 includes a server information collection module 211 for collecting the user history information as the user uses the SCWS function installed in the smart card 200, a card information collection module 212 for collecting the user history information, which is stored based on the USIM installed in the smart card 200, and a terminal information collection module 213 for collecting the user history information received from the user terminal 100.

The server information collection module 211 collects the user history information including the user input information, which is required when the user uses the SCWS function. Preferably, the server information collection module 211 collects user input information, which is essentially required when the user initially uses the SCWS function. The user input information refers to primary data made by the user, such as age, sex, address and hobbies of the user. The range of the primary data may vary depending on the settings of the administrator.

In addition, the server information collection module 211 collects the access history information to the site requested by the user. In detail, the server information collection module 211 collects the external access history of the user through the browser installed in the user terminal 100 and the access URL information managed by the Website or registered in the SCWS in the form of cookie files as the user accesses applet-based sites installed in the smart card 200 based on the SCWS function. When the server information collection module 211 collects the user history information, which is generated as the user uses the SCWS function, the server information collection module 211 can extract the user history information from the applets based on the SCWS function by applying the shareable interface mechanism defined in Java Card 2.2.1.

In addition, the card information collection module 212 collects the user history information including the call history information of the user terminal 100, which is stored based on the USIM. In detail, the card information collection module 212 collects the call history information of the user terminal 100 stored in the file structure of the USIM.

Further, the terminal information collection module 213 collects the user history information received from the user terminal 100. In detail, the smart card 200 collects location and time information, which are included in the base station information received from the user terminal 100, through the CAT (credit authorization terminal) framework according to the predetermined period set by the user, that is, according to the events. Besides the base station information, the terminal information collection module 213 may receive various external data from the user terminal 100 or external servers according to the settings of the user.

The personalized information extraction unit 220 extracts the personalized information based on the user history information collected through the history information collection unit 210 by performing the data mining (data mining function of the smart card shown in FIGS. 1 and 2). In detail, the personalized information extraction unit 220 extracts the personalized information including the preferences, favorites, interests and propensities of the user by performing the data mining based on the user history information, such as the call history, location history, purchase history, visit history and personal information. The data mining may be performed through a mining mechanism including a neural network, K-means clustering and decision tree.

The interface provision unit 230 provides an interface for the extracted personalized information upon the request from the specific applications located inside or outside the smart card 200 (application linkage function of the smart card shown in FIGS. 1 and 2). In detail, the interface provision unit 230 provides the personalized information extracted through the data mining function upon the request from the specific application installed in the smart card 200 as an applet or located in a server of a mobile communication network, so that various special services can be provided to the user through the operation of the specific application receiving the personalized information.

As described above, the smart card 200 according to the present invention obtains the personalized information based on the SCWS function and the USIM installed in the smart card 200, so that the smart card 200 can collect and extract various items of personalized information without being linked with the network server.

Figure 6:
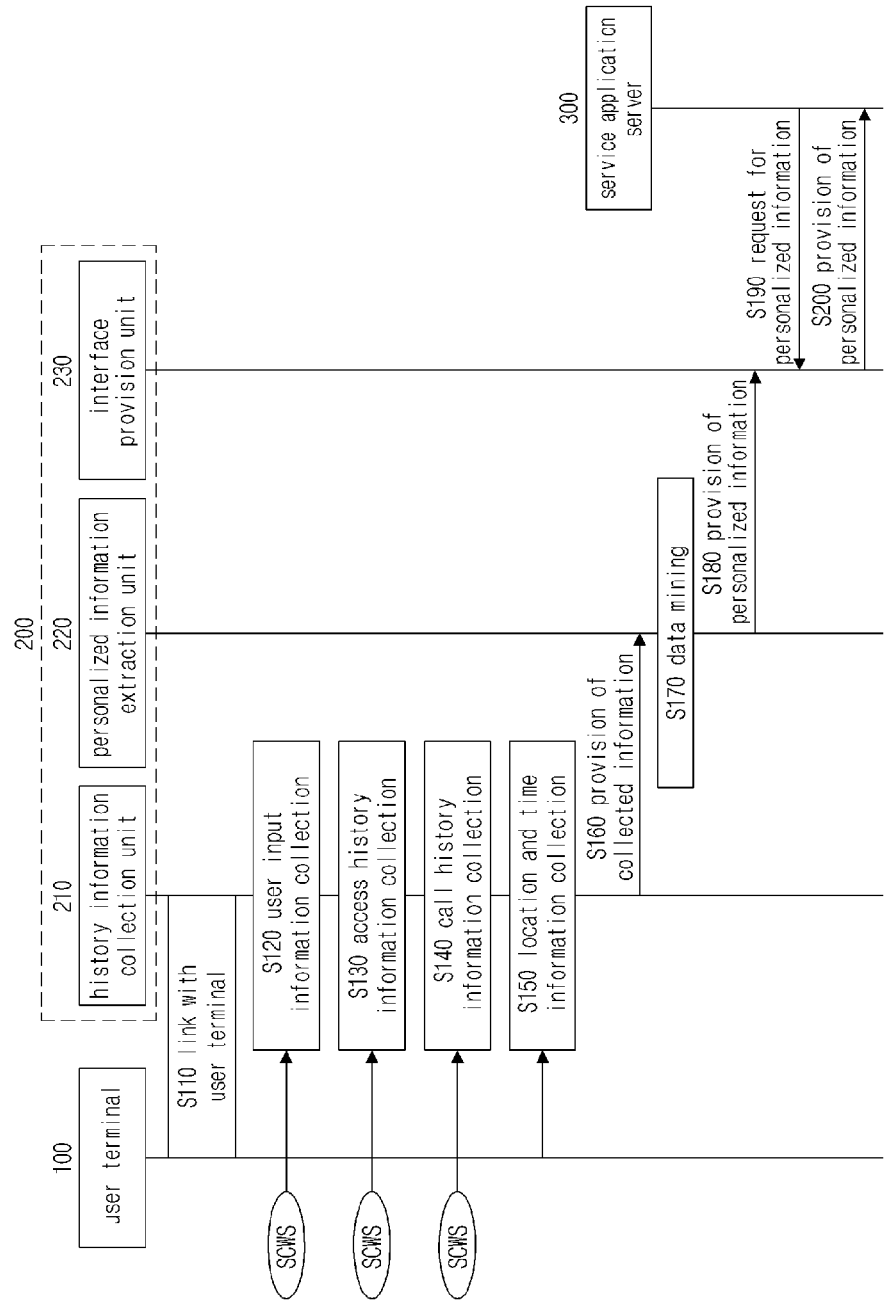
FIG. 6 is a flowchart schematically showing a method for a personalized service based on a smart card according to an embodiment of the present invention.

Hereinafter, the method for the personalized service based on the smart card according to the embodiment of the present invention will be described with reference to FIG. 6. For the purpose of convenience, the same reference numerals will be used to refer to the same elements throughout the drawings.

First, the smart card 200 is linked with the user terminal 100 equipped with the browser (S110). Preferably, in a state in which the user terminal 100 is mounted on the smart card 200, the operation for the personalized service is performed according to the events occurring from the specific external server, the user terminal 100 or the smart card 200. In detail, the operation for the personalized service is performed on the basis of predetermined events, such as the server triggering event generated from the specific external server, the local triggering event generated from specific applications installed in the user terminal 100 and the smart card 200, and the auto-triggering event periodically occurring from the smart card 200.

Then, the smart card 200 collects the user history information in cooperation with the user terminal 100 (S120 to S160). Preferably, the history information collection unit 210 is linked with the user terminal 100 to collect the user history information based on the SCWS function and the USIM. In detail, the server information collection module 211 collects user input information, which is essentially required when the user initially uses the SCWS function. In addition, the server information collection module 211 collects the external access history of the user through the browser installed in the user terminal 100 and the access history information for the site requested by the user stored in the SCWS. In addition, the card information collection module 212 collects the call history through the user terminal 100 stored in the file structure of the USIM, and the terminal information collection module 213 collects the user history information received from the user terminal 100. In detail, the smart card 200 collects location and time information, which are included in the base station information received from the user terminal 100, through the CAT (credit authorization terminal) framework according to the predetermined period set by the user, that is, according to the events.

After that, the smart card 200 performs the data mining to obtain the personalized information based on the user history information (S170 and S180). Preferably, the personalized information extraction unit 220 extracts the personalized information based on the user history information collected through the history information collection unit 210 by performing the data mining. In detail, the personalized information extraction unit 220 extracts the personalized information including the preferences, favorites, interests and propensities of the user by performing the data mining based on the user history information, such as the call history, location history, purchase history, visit history and personal information. The data mining may be performed through a mining mechanism including a neural network, K-means clustering and decision tree.

Then, the smart card 200 provides the personalized information, which is extracted through the data mining, to the specific application upon the request of the specific application (S190 and 5200). Preferably, the interface provision unit 230 provides the interface for the extracted personalized information upon the request of the specific application located inside or outside the smart card 200. In detail, the interface provision unit 230 provides the personalized information extracted through the data mining function upon the request from the specific application installed in the smart card 200 as an applet or located in a server of a mobile communication network, so that various special services can be provided to the user through the operation of the specific application receiving the personalized information.

As described above, according to the method for the personalized service based on the smart card of the present invention, the personalized information is obtained based on the SCWS function and the USIM installed in the smart card 200, so that the smart card 200 can collect and extract various items of personalized information without being linked with the network server.

The method and steps of the algorithm described above related to the embodiments of the present invention may be realized in the form of hardware, software executed by a processor, or combination of the hardware and software. The software module may reside in a storage medium, such as a RAM memory, a flash memory, a ROM memory, an EPROM memory, an EEPROM memory, registers, a hard disc, a mobile disc, a CD-ROM, or other storage devices generally known in the art. The storage medium is connected to the processor, so that the processor may read information from the storage medium or record the information onto the storage medium. Alternatively, the storage medium can be integrated in the processor. The processor and the storage medium may be included in an ASIC. The ASIC may be included in the terminal. Alternatively, the processor and the storage medium may serve as components of the terminal.

Although the exemplary embodiments of the present invention have been described, it is understood that the present invention should not be limited to these exemplary embodiments but various changes and modifications can be made by one ordinarily skilled in the art within the spirit and scope of the present invention as hereinafter claimed.

[Industrial Applicability]

The system and method for the personalized service and the smart card according to the present invention can obtain various items of personal information by using the smart card without being linked with the network server. Thus, the present invention overcomes the problems occurring in the prior art, so that the present invention is applicable in various fields in terms of sales and business and very useful in practice with higher industrial applicability.

The invention claimed is:

1. A system for a personalized service based on a smart card, the system comprising:
   a user terminal linked with the smart card for accessing a site requested by a user through a browser installed in the user terminal; and
   the smart card, with an SCWS (smart card web server) and a USIM (universal subscriber identity module) combined therein, for collecting and storing user history information, accumulated by the SCWS and the USIM, based on predetermined events, and performing a data mining based on the user history information to extract personalized information, wherein the user history information is collected from the user terminal through a CAT (credit authorization terminal) framework.

2. The system of claim 1, further comprising a service application server for providing the personalized service based on the personalized information extracted through the smart card.

3. The system of claim 2, wherein the service application server is installed in the smart card as an applet or located in a mobile communication network as a separate server, to provide the personalized service based on the extracted personalized information.

4. A smart card for a personalized service, the smart card comprising:
   the smart card, wherein the smart card comprises:
   a history information collection unit linked with a user terminal having a browser, for collecting user history information based on predetermined events;
   a personalized information extraction unit for performing a data mining based on the user history information and extracting personalized information; and
   an interface unit for providing the extracted personalized information upon a request from a specific application located inside or outside the smart card, wherein an SCWS and a USIM is combined in the smart card, and wherein the user history information is collected from the user terminal through a CAT (credit authorization terminal) framework.

5. The smart card of claim 4, wherein the history information collection unit collects the user history information based on the predetermined events generated from the smart card and the user terminal or from an external server.

6. The smart card of claim 5, wherein the history information collection unit comprises:
   a server information collection module for collecting the user history information related with the usage of the SCWS;
   a card information collection module for collecting the user history information stored in the USIM; and
   a terminal information collection module for collecting the user history information received from the user terminal.

7. The smart card of claim 6, wherein the user history information collected by the server information collection module comprises user input information required to use the SCWS and access history information, stored in the SCWS, which contains access history to sites requested by the user.

8. The smart card of claim 6, wherein the server information collection module collects the user history information from applets based on the SCWS, through a shareable interface mechanism defined in Java Card 2.2.1.

9. The smart card of claim 6, wherein the user history information collected by the card information collection module comprises call history information of the user terminal, stored in the USIM.

10. The smart card of claim 6, wherein the user history information collected by the terminal information collection module comprises location and time information received from the user terminal.

11. The smart card of claim 6, wherein the terminal information collection module collects the user history information from the user terminal through the CAT (credit authorization terminal) framework.

12. The smart card of claim 4, wherein the personalized information extraction unit extracts the personalized information from the user history information through a mining mechanism including at least one of a neural network, a K-means clustering and a decision tree.

13. A method for providing a personalized service based on a smart card in cooperation with a user terminal having a browser, the method comprising the steps of:
   collecting user history information in the smart card based on predetermined events;
   performing a data mining based on the collected user history information; and
   providing personalized information extracted through the data mining to a specific application upon a request thereof, wherein the collected user history information comprises: user input information required to use a SCWS, which is combined with the smart card, and call history information of the user terminal, stored in a USIM, and wherein the user history information is collected from the user terminal through a CAT (credit authorization terminal) framework.

14. The method of claim 13, wherein the predetermined events comprises events generated from a specific external server, the user terminal or a smart card.

15. The method of claim 14, wherein the collected user history information comprises access history information, stored in the SCWS, which contains access history to sites requested by a user.

16. The method of claim 14, wherein the user history information is collected from applets based on the SCWS, through a shareable interface mechanism defined in Java Card 2.2.1.

17. The method of claim 14, wherein the
the collected user history information comprises location and time information received from the user terminal.

18. The method of claim 13, wherein the personalized information is extracted from the user history information through a mining mechanism including at least one of a neural network, a K-means clustering and a decision tree.

19. The method of claim 13, wherein the personalized information is provided to the specific application, which is located inside or outside the smart card.

20. A non-transitory computer-readable recording medium comprising computer readable code to control at least one processing device to implement a method for providing a personalized service based on a smart card in cooperation with a user terminal having a browser, the method comprising:

collecting user history information in the smart card based on predetermined events;

performing a data mining based on the collected user history information; and providing personalized information extracted through the data mining to a specific application upon a request thereof, wherein the collected user history information comprises: user input information required to use a SCWS, which is combined with the smart card, and call history information of the user terminal, stored in a USIM, and wherein the user history information is collected from the user terminal through a CAT (credit authorization terminal) framework.

\* \* \* \* \*